United States Patent [19]

Martell et al.

[11] Patent Number: 4,601,867
[45] Date of Patent: Jul. 22, 1986

[54] METHOD OF MAKING CAST-TO-SIZE EPOXY TOOLS FOR STAMPING SHEET METAL PANELS

[75] Inventors: William A. Martell, Sterling Heights; Ladislaus Weiss, Clawson, both of Mich.

[73] Assignee: General Motors Corporation, Detroit, Mich.

[21] Appl. No.: 627,540

[22] Filed: Jul. 3, 1984

[51] Int. Cl.⁴ ............................................. B29C 33/40
[52] U.S. Cl. .................................. 264/227; 264/225; 264/226
[58] Field of Search ............... 264/225, 226, 227, 220, 264/219, 2.5, 104; 249/134

[56] References Cited

U.S. PATENT DOCUMENTS

| | | | |
|---|---|---|---|
| 2,836,530 | 5/1958 | Rees | 154/110 |
| 3,065,511 | 11/1962 | Leitzel | 264/225 |
| 3,101,065 | 8/1963 | Kalis | 264/225 |
| 3,239,590 | 3/1966 | Trimble | 264/226 |
| 4,086,118 | 4/1978 | Dewey | 264/225 |
| 4,141,532 | 2/1979 | Wall | 249/134 |
| 4,380,421 | 4/1983 | Morris | 249/134 |
| 4,423,094 | 12/1983 | Dearlove et al. | 427/386 |

OTHER PUBLICATIONS

Plastics Materials and Processes, Schwartz and Goodman, 1982, p. 365.
WO83/03792, Lindskog, "A Mould Part and a Method in its Manufacture and Use", 11/1983.
Modern Plastics Encyclopedia, vol. 59, No. 10A, 1982-83, pp. 32, 34, 35, 470-472.
CRC Handbook of Chemistry and Physics, 51st ed., 1970-71, p. E-10.

*Primary Examiner*—Donald Czaja
*Assistant Examiner*—Mary Lynn Fertig
*Attorney, Agent, or Firm*—Elizabeth F. Harasek

[57] ABSTRACT

Very large tools can be cast-to-size by making a pattern of the article to be formed by the tool, laying the pattern up in a pattern box, applying a release coat and coating the pattern and box with a tough, curable tool surface layer. A small amount of epoxy filled with a thermally conductive particulate filler is cast into the pattern box before the surface layer fully cures. Relatively large chunks of thermally conductive material are added to the box which are covered with additional cast epoxy. The cure of the epoxy is controlled to effect complete cure at room temperature within a few days but never to exceed a peak cure temperature above about 70° C.

7 Claims, 10 Drawing Figures

METHOD OF MAKING CAST-TO-SIZE EPOXY TOOLS FOR STAMPING SHEET METAL PANELS

This invention relates to a novel method of making large, cast-to-size, epoxy tools which are rugged enough to stamp sheet steel.

BACKGROUND

Cast polymeric tools are well known for making tools to stamp sheet metal or mold plastics. However, all cast polymeric materials such as nylons, polyesters, epoxies and urethanes shrink and/or change shape as they harden and cure. Therefore, it has not been possible to simply cast large tools to size. The problem is further aggravated by the fact that polymer shrinkage is not predictable at a particular location of a tool, particularly where the tool varies in cross section along its length. Furthermore, the uneven cure exotherm of thermosetting resins such as epoxies can cause a large tool to warp or loose strength. In the past, no satisfactory way was known to prevent or compensate for uneven exotherm in very large cast tool bodies.

While it is relatively easy to compensate for polymer shrink in very small tools, it is a very serious problem when one wants to make large tools such as punch and die sets for stamping sheet steel automotive body panels. For example, epoxy resins based on aliphatic amine-cured diglycidyl ethers of bisphenol-A exhibit shrinkage of about 0.9% when unfilled, and from about 0.4 to 0.8% when filled with 20 weight percent of various fillers (see Plastics Materials and Processes, Schwartz and Goodman, Van Nostrand Reinhold Company, 1982, page 365). A tool two meters in length molded from such epoxy would therefore be expected to shrink as much as 8 to 18 mm. Accordingly, large molds could not be cast to size directly from patterns.

The shrink problem of large cast tools has been addressed in a number of ways. For example, U.S. Pat. No. 2,836,530 to Rees discloses a method of tool making in which the surface of the mold for casting the tool is coated with a thin spacing layer of an easily removable material. A hardenable resin is cast into the mold and solidified. During solidification, the cast body shrinks. Rees compensates for this shrinkage by withdrawing the hardened body from the mold and removing the spacing layer from the molding surface. The body is then replaced in the mold and a layer of surfacing material the thickness of the removed spacing layer is added between the body and the mold. When this surfacing layer hardens, it compensates for the shrinkage of the precast large body.

This method creates a number of problems. Because the tool surface is bonded to the body of the tool only after it has already set, there is always a danger of delamination. Moreover, this two-step molding process is cumbersome and time consuming.

U.S. Pat. No. 3,239,590 to Trimble handles the shrinkage problem in a different way. A thin layer of wear-resistant plastic is applied over the surface of the tool mold and is allowed to harden. A reinforcing layer of thermosetting plastic and reinforcing binder is then built up behind the facing layer. Finally, a thin parting film is applied over the built-up and cured layers and a thermosetting plastic resin is poured over the film to fill the tool mold. This resin shrinks as it cures.

After the poured resin has set, it and the parting film are removed from the mold. The film is stripped away and the shrunk cast backing is replaced in the mold over a layer of uncured thermosetting resin. This resin compensates for shrink in the backing and adhesively bonds the facing layer and backing together.

An obvious disadvantage of this method is that it is time consuming. Another problem is that the adhesive bond between the backing and facing would be the weakest point of the tooling and would be subject to fracture under the high pressure impact conditions of metal stamping.

U.S. Pat. No. 4,423,094 to Dearlove et al and assigned to General Motors Corporation, relates to a tough, durable, epoxy novolac material for use in making metal stamping dies. While this material exhibits good characteristics for tooling, it requires a two-step cure. It must first be hardened at room temperature and then post cured at an elevated temperature of about 150° C. It would be preferable to make dies that need no elevated temperature cure. It would also be preferable to mold tools from resins less expensive than epoxy novolacs.

Accordingly, a new method of making large, cast-to-size epoxy tools for metal stamping and polymer molding applications has been developed. More particularly, a method of making such tools directly from a full scale model of the article to be stamped or molded has been invented.

BRIEF SUMMARY

In accordance with a preferred embodiment, a large, cast-to-size tool suitable for stamping sheet metal can be made as follows. A model or actual article to be formed by the cast-to-size tool is provided. A parting agent is applied to the model surface and dams are constructed from clay or other suitable material to define the edges of the tool. A layer of hardenable material, preferably reinforced with a fabric or fiber layer is applied to the model surface to produce a reverse image, i.e. pattern, of the stamping tool surface. This layer is backed with a layer of syntactic foam, plaster or other filler sufficient to support the weight of the tooling epoxy.

The pattern is enclosed in a jig and a pattern box is constructed around it. The form is oriented and supported in the box to locate the mold surface in stamping position. A release coat is applied to the form and the interior box surfaces. A hardenable, abrasion resistant surfacing layer is then applied over the release coat. Before this surface coating is completely cured, a liquid epoxy resin filled with at least 50 volume percent of small particles of metal is poured into the box. While the epoxy is still liquid, at least 30 volume percent of thermally conductive chunks of the same filled epoxy composition, rocks, metal, or other suitable reinforcing material, are added to the mold box. If necessary, a wire mesh screen can be positioned over the chunks to keep them from floating. The box is then filled with additional liquid epoxy to form the base of the tool. Thermocouples may be embedded in the liquid resin to monitor cure temperatures as well as anchors for mounting the finished tool to a press The liquid epoxy is cured in the box at room temperature making sure that the internal temperature within the cast epoxy tool never exceeds about 70° C. Generally, complete cure takes from about 48 hours to one week depending on the size of the tool. We have observed that the center of the tool body seems to cure first. We believe that this allows the still liquid epoxy near the tool surface to reflow and compensate for any shrink that may occur as the body hardens from the center outwards.

A tool formed in this way can be used in a conventional metal press to stamp ordinary cold-rolled 0.9 mm thick sheet steel against a resilient block or in conjunction with a matched die. A matched die can be formed using the epoxy tool as a model as will be described hereinafter. Tools up to about 2.0 meters long weighing over four thousand kilograms have been made which show no measurable shrink or distortion compared to the pattern.

While this brief summary relates to making metal stamping tools, the method is equally applicable to the manufacture of tools for molding thermoplastic or thermosetting polymers. Female tools for molding plastics can generally be formed directly from a model of the article to be molded.

DETAILED DESCRIPTION

The invention will be better understood in view of the figures and the detailed description which follow. In the figures.

In accordance with a preferred embodiment of the invention, a matched set of epoxy tools for stamping an automotive door panel were made as follows.

Figure 1:
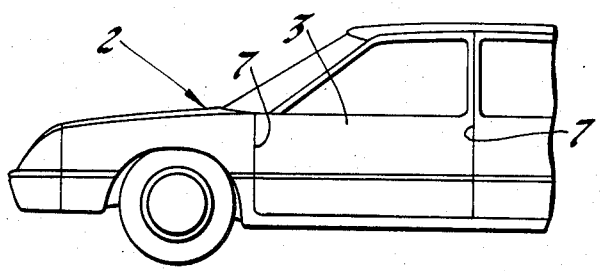
FIG. 1 shows a clay buck for a full scale model of an automotive door panel from which the pattern for the punch of a matched punch and die set is taken.
Figure 2:
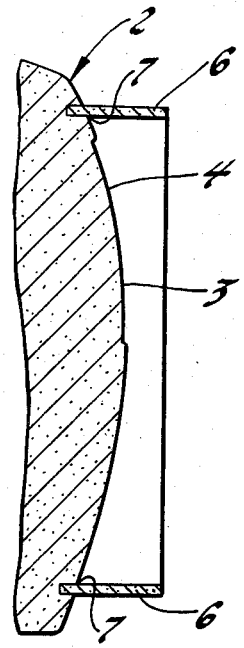
FIG. 2 shows a section of the buck of FIG. 1 after a clay dam has been constructed at the door edges.
Figure 3:
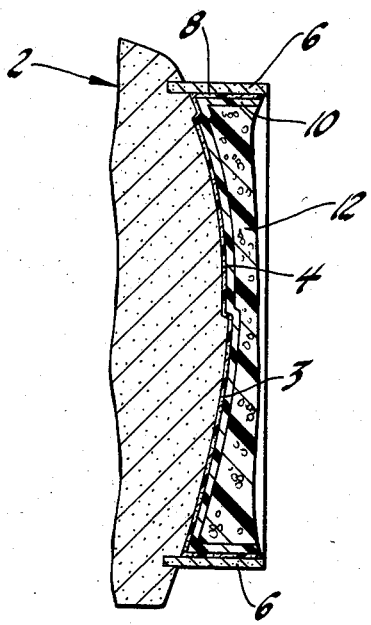
FIG. 3 shows the door buck after the pattern for making an epoxy punch has been applied.

FIG. 1 shows a clay buck 2 of a prototype automotive vehicle. Full size clay bucks are used in the automotive industry to make patterns for hammer-form dies used to make prototype automotive vehicle panels. The door panel 3 of clay buck 2 was used as a pattern. Referring to FIG. 2, surface 4 of clay door panel 3 is sized to equal the size of the finished part less the thickness of the sheet metal used to make the part. Clay dam 6 is added to clay buck 2 to define the door edges 7. FIG. 3 shows the dammed door panel after a pattern for casting an epoxy tool has been formed. The pattern is made by applying a very thin layer of parting agent 8 to the clay buck surface. Polyvinyl alcohol has been found to be a suitable parting agent which also serves to seal the clay to prevent it from mixing with the resin used to form the surface of the pattern. After parting agent 8 has dried, a fiberglass cloth impregnated with epoxy resin 10 is laid over the parting agent. The epoxy resin is gently worked with a roller or brush to make sure it conforms perfectly to the buck surface. After this layer has set, a syntacic urethane foam 12 is cast behind it to provide the epoxy-fiberglass layer with support.

Figure 4:
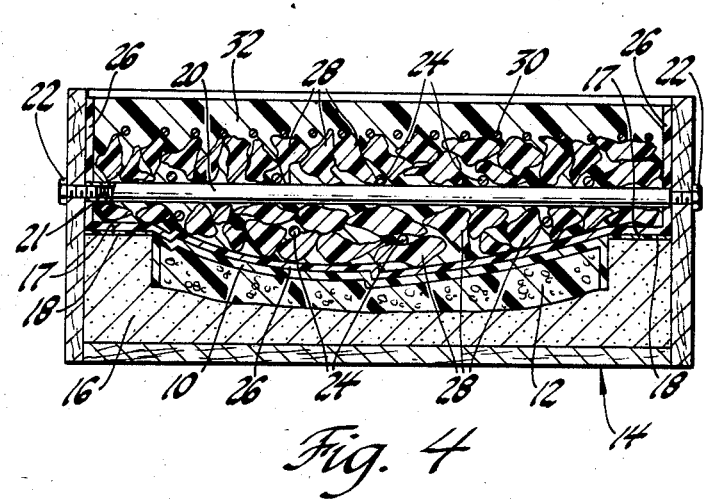
FIG. 4 shows the pattern fit in a pattern box after an epoxy punch has been cast.

Referring to FIG. 4, the pattern of FIG. 3 is shown set in a wooden pattern box 14. The pattern is set in sand 16 or some other retaining medium, the top surface of which which defines flange 17 for the metal part to be stamped. The flange surface is provided with a smooth polymeric coating 18 to form a good surface for casting the epoxy resin.

Box 14 shown in FIG. 4 is made of wood, but another box material capable of retaining the pattern and the cast tool would be equally suitable. A very thin layer of parting agent (not shown) is applied to the surface of the pattern, the flange surfaces, and the box surfaces against which the tool will be cast. Polyvinyl alcohol is also suited to this application.

Where very large tools are made, it is much preferred to mold in the means for mounting the tools to a press. FIG. 4 shows one of several steel pipes 20 with threaded internal diameters 21 at the ends which were later used to mount the tool to a press. Pipes 20 were inserted through box 14 and capped with bolts 22 to prevent leakage of cast epoxy.

Different tools may require different surface characteristics to optimize wear and performance. Room temperature curable epoxies filled with silicon carbide powder or other abrasion resistant fillers are suitable for sheet metal stamping tools. Another preferred surface material for stamping tools is UC-25, a room temperature curable, two-part urethane made by KONAP Chemical Co. This urethane seems to adapt well to stamping sheet metal. A surface layer 26 is applied to the pattern flange box surfaces. Because the layer is thin, generally not more than 15 mm thick, it conforms to the pattern without shrink.

In order to get a good bond between surface layer 26 and epoxy backing resin 32, it is preferred to cast the body of the tool before surface layer 26 has fully cured. Accordingly, after the surface layer 26 is applied, pattern box 14 is filled about one third of the way with a suitable epoxy resin 32, such as Magnolia Plastics, Inc. product nos. 6010, 6012, 6013, 6015, 6025 Magno-Ceram and Super-Ceram. At this point, steel rods 24 of the type used to reinforce concrete are positioned in the pattern box. These rods help reinforce very large tools but are not necessary in smaller tools. The box is then filled nearly to the top with chunks 28 of a thermally conductive, high strength filler. The liquid epoxy already in the pattern box prevents the chunks from damaging the pattern or tool surface.

We have found that the filler chunks should comprise at least about 30 volume percent and preferably about 70 volume percent of the entire tool in order to prevent shrink as the epoxy cures and increase the compressive strength of the tool. It is also necessary that the filler chunks readily transmit heat generated by the epoxy exotherm. Dissipation of heat by the chunk filler prevents the occurrence of hot spots within the tool body which can cause it to shrink and warp.

One very suitable chunk filler is large pieces of old epoxy tools made in accordance with this invention. Another suitable material is fieldstone rocks up to several inches in diameter. Rocks have high compressive strength and are sufficiently thermally conductive to moderate epoxy cure. We found that concrete chunks do not have adequate compressive strength for making sheet metal stamping tools but they could be adequate for lower compressive strength applications, such as in molds for molding plastics. Large pieces of scrap iron, steel, aluminum, copper, or ceramic would also be suitable.

If the filler chunks have a lower specific gravity than the cast epoxy, a screen 30 can be placed over chunks 28 to keep them from floating. After all the chunks have been added, the pattern box is filled to the desired level with additional epoxy 32.

The type of epoxy used to cast tools is not critical so long as it does not reach a temperature above about 70° C., and preferably below about 65° C., when it is allowed to cure at room temperature (about 23° C.). Both during cure and end use of a tool, it should not be exposed to temperatures above the glass transition temperature Tg. At the Tg, the properties of an epoxy change from being very hard and brittle to relatively soft and more flexible. Above the Tg, stress applied to a tool could cause permanent deformation. Exotherms above the Tg during cure could cause shape changes which become permanent when the tool is fully hardened.

As noted above, the incorporation of large chunks of thermally conductive material greatly helps dissipate heat generated by the epoxy cure exotherm. It is also helpful to use as high a volume of filler chunks as possible to decrease the bulk of heat-generating epoxy present when the tool is cast.

The preferred epoxy is a diglycidyl ether of bisphenol-A (DGEBA) resin such as the Epon series of DGEBA resins sold by Shell Chemical Co. The preferred epoxy hardeners are stoichiometric (rather than catalytic), aromatic, polyfunctional, primary amines such as dimethylaniline (DMA) or adducts thereof. The epoxy resin and curing agent are mixed in stoichiometric ratios (about 90 parts by volume epoxy to 10 parts by volume curing agent) immediately before they are used to prevent premature hardening.

The liquid epoxy resins should be filled with at least 30 volume percent and preferably 70 volume percent of a thermally conductive particulate filler. As much filler as can be used without losing pourability of the epoxy resin is preferred. The use of two fillers is required by the practice of my invention: first, large chunks (from a few millimeters to many centimeters across) of a thermally conductive, high strength material that will bond well with the cast epoxy, and second, small particles (less than a few millimeters across) of thermally conductive filler which are incorporated in the liquid epoxy before it is cast. This particulate filler adds strength to the epoxy, but it also mediates the exotherm of the epoxy cure along with the chunk filler. A preferred particulate filler is iron filings although other metal, ceramic, stone, glass, graphite, mineral fiber or other small particle fillers would also be suitable.

Figure 5:
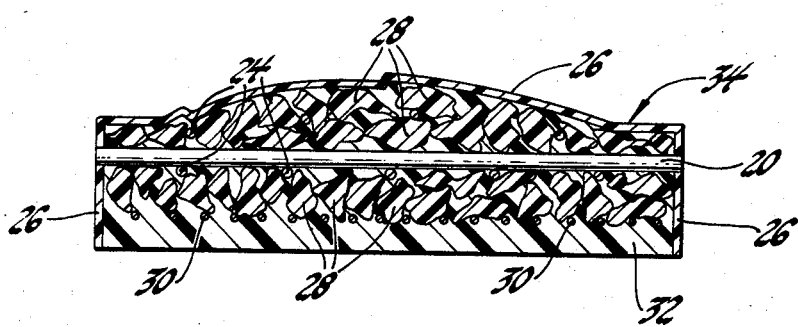
FIG. 5 shows the punch of FIG. 4 after it has set.

FIG. 5 shows the male tool or punch 34 of FIG. 4 after hardening and removal from box 14. It could be mounted on a press as is and used in conjunction with a rubber pad to partially form a sheet metal door panel. Forming could then be completed by hammering the sheet metal around the tool edges with a soft mallet. However, the tools made by the subject method are also tough enough to be used as both members of a matched die set.

Figure 6:
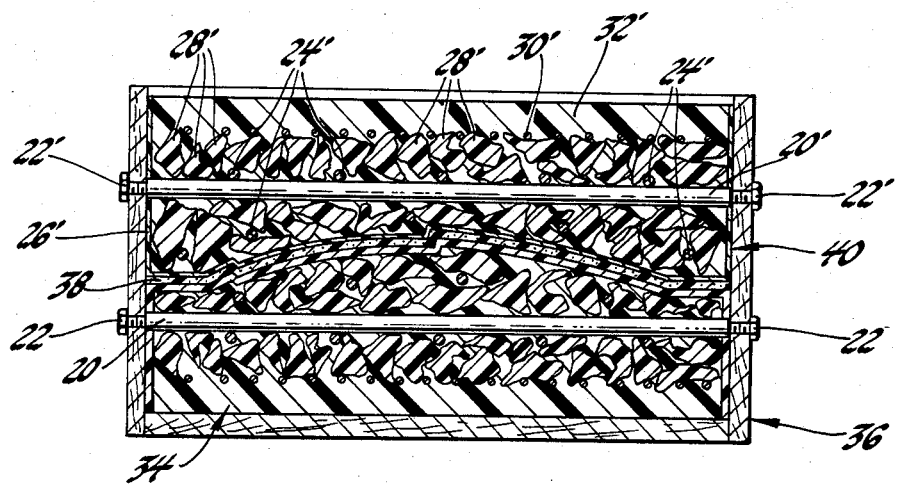
FIGS. 6 and 7 show a pattern box for molding a die using the punch of FIG. 5 as a pattern.
Figure 7:
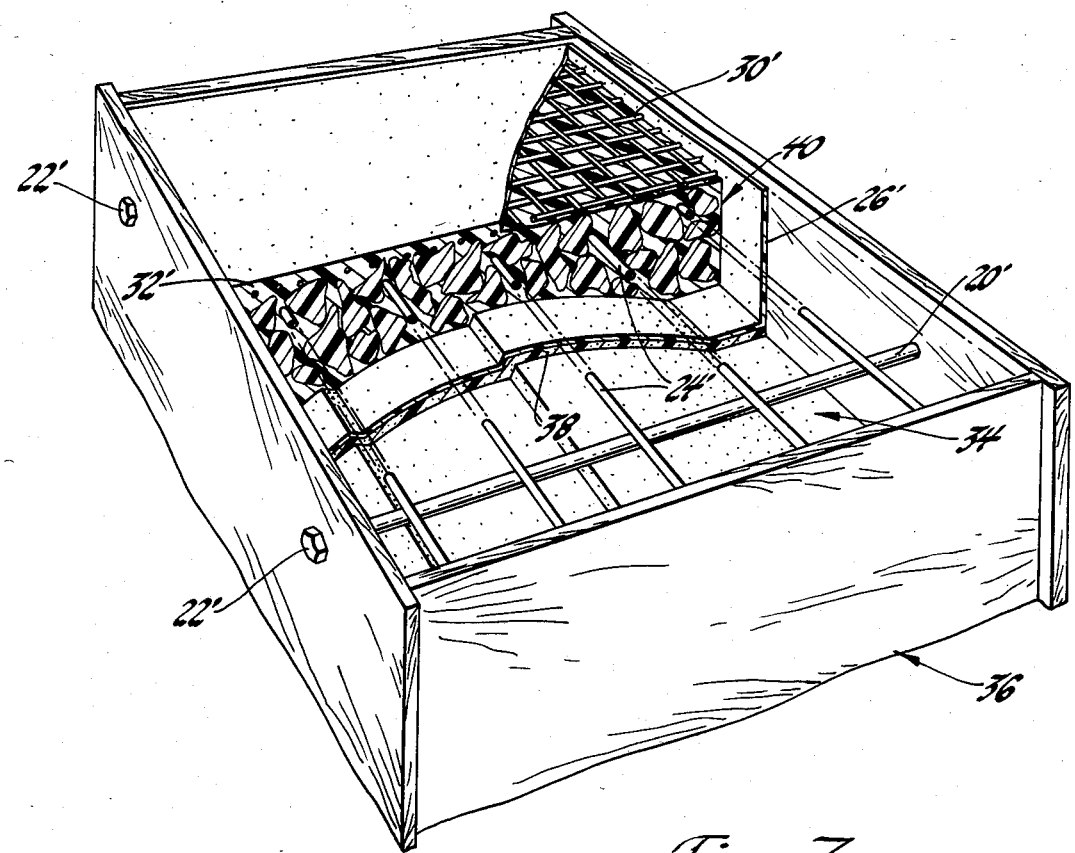

FIG. 6 shows male tool 34 of FIG. 5 mounted in pattern box 36 preparatory to making a complementary female tool 40. Tool 34 is fixed in the bottom of box 36 by bolts 22 inserted in the ends of steel pipes 20. A layer of wax 38 which has the same thickness as the metal to be stamped with the tool is layed on the surface of male tool 34. This allows the finished tools to work with one another without binding. A thin layer of parting agent (not shown) is applied to the wax 38 and the sides of box 36. Pipes 20' with threaded ends for mounting female tool 40 to the press are inserted through box 36 and capped with bolts 22'. An abrasion resistant surface coat 26' such as that used for the male tool is applied. Reinforcing rods 24' are then inserted in the box. Before surface coat 26' is fully cured, pattern box 36 is filled with epoxy 32' about one third of the way up from the male tool. The box is then filled nearly to the top with chunks 28' of thermally conductive, high strength filler of the type desribed above. A screen 30' may be used to keep the chunks 28' from floating. Enough liquid epoxy 32' is added to cover the chunks and fill the box. FIG. 7 shows a section of the box in perspective after the female tool has been cast using the wax coated male tool as a pattern.

Figure 8:
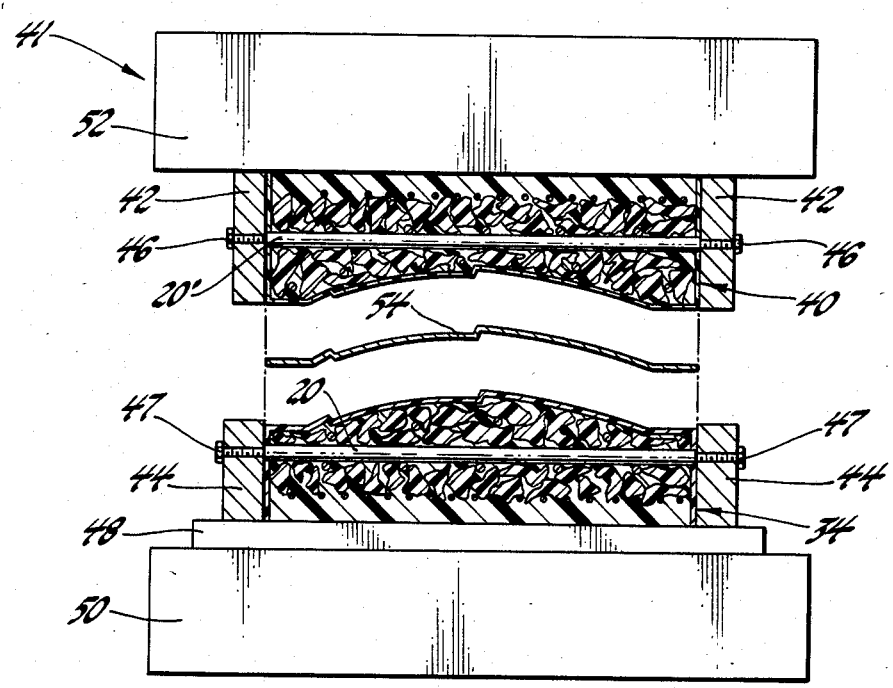
FIG. 8 shows the epoxy punch and die mounted in a sheet metal stamping press and a sheet metal part formed with them.

FIG. 8 shows the matched male and female dies of FIGS. 6 and 7 mounted in a metal stamping press 41. Female tool 40 was fastened to binder ring 42 of top platen 52 by mounting bolts 46 in pipes 20'. Male tool 34 was fastened to binder ring 44 resting on base 48 on bottom platen 50 by mounting bolts 47. The tools were successfully used to stamp several 9 mm thick cold rolled steel door panels 54.

Tools of this sort have been used to stamp many different sheet steel automotive exterior panels and structural parts. None of the tools has, to date, been run until failure. 209 engine cradles, a long, narrow part with a fairly deep draw, were stamped from 15.2 mm thick steel with no measurable tool wear or damage.

Figure 9:
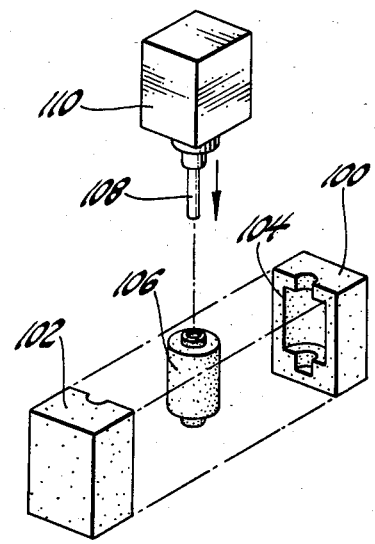
FIG. 9 is a diagrammatic view of epoxy molds made in accordance with this invention for blow molding a bottle.

FIG. 9 shows molds 100 and 102 made in accordance with this invention. The molds shown are for blow molding a hollow bottle 106 in mold cavity 104. A thermoplastic parison for the bottle is inflated with air from blow pin 108 of manifold 110 while molds 100 and 102 are closed. Ducts for carrying a liquid to regulate mold temperature can be incorporated in the molds in the same manner that mounting pipes 20 were incorporated in the sheet metal stamping dies. The inclusion of a large volume of thermally conductive filler in the epoxy and filler chunks in the tools makes them particularly useful in plastic molding operations where mold temperatures may vary throughout each molding cycle. In any molding or stamping operation it is important to choose an epoxy resin with a higher glass transition temperature than the use temperature to prevent tool damage. Blow molds for making hollow automotive seat back were made substantially by the method used to make the metal stamping tools described above. 150 seat backs were successfully molded from glass filled, modified polypropylene oxide resin, Noryl, sold by General Electric at about 330° C. in the epoxy molds.

Figure 10:
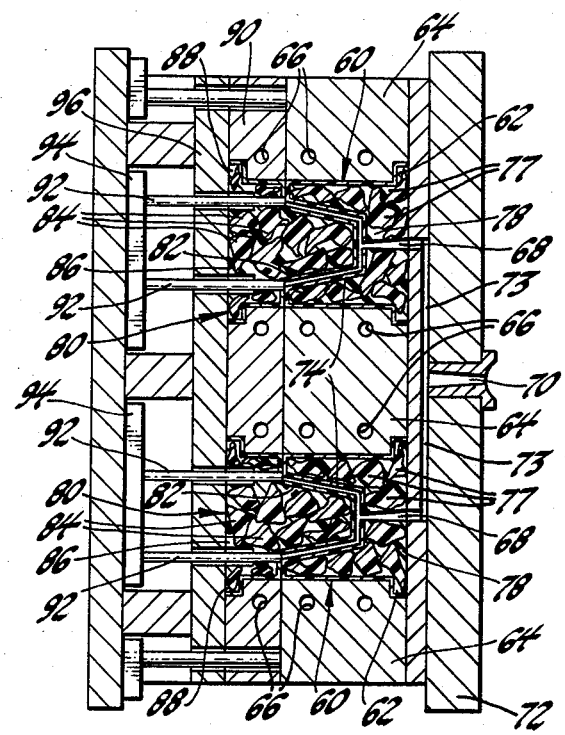
FIG. 10 shows the subject epoxy tool mounted in an injection molding press for making a cup shaped object.

FIG. 10 shows the clamp portion of a machine for injection molding a cup shaped object with molds made in accordance with this invention. Female molds 60 may have an undercut base 62 which secures the mold in place in retainer plate 64. Plate 64 is shown with cooling lines 66 although these lines could be molded into the epoxy molds. Sprues 68 for filling the molds would be formed at the time female molds 60 are cast. The polymeric materials runs from the injection port 70 in mold base 72, through runners 73 then into sprues 68.

Female molds 60 have a generally cylindrical and an abrasion resistant surface 74. The molds are shown filled with chunks 77 of broken up tools of like composition. The chunks are embedded in an iron filled epoxy resin 78. Male tools 80 also have an abrasion resistant surface layer 82 and a body of chunks 84 embedded in epoxy 86.

Male molds 80 have a base 88 by which they are secured in retainer plate 90. Annular orifices would be formed in the male molds to accomodate ejector pins 92 carried on ejector plates 94. The mold base 96 is designed to accomodate the ejector mechanism. The epoxy used to make such tools is preferably filled with about 70 volume percent steel particles. This makes it easy to thermally cycle the tools as required in injection molding of thermoplastics.

Seventy radiator shrouds were injection molded in tools made from Super Ceram sold by Magnolia Plastics in accordance with the invention. Some of the parts were made of polyethylene, some from acrylonitrile butadiene styrene and some from polycarbonate. Temperatures of about 320° C. were seen by the tool with no adverse side effects.

We are confident that the subject method of casting tools to size also has applicaton to making vacuum forming tools, compression molding tools, calendering rolls and to other plastics forming tools.

In summary, we have invented a new method of making very large, cast-to-size, epoxy tools. The method entails taking a pattern of a tool, laying the pattern up in a pattern box, applying a release coat and coating the pattern with a tough tool surface layer. A small amount of epoxy is cast into the box before the surface layer fully cures followed by the addition of chunks of thermally conductive material. The box is filled with additional liquid epoxy to cover the chunks and form a flat backing for the tool. The cure of the poured epoxy is carefully controlled to effect complete cure within a few days but to never exceed a peak cure temperature above about 70° C.

While our invention has been described in terms of specific embodiments thereof, other forms could be readily adapted by one skilled in the art. Accordingly, the scope of the invention is to be limited only by the scope of the claims.

The embodiments of the invention in which an exclusive property or privilege is claimed are defined as follows:

1. A method of making a large, cast-to-size, epoxy tool comprising the steps of providing a pattern of the article to be formed by the tool; orienting said pattern in a pattern box; applying a release coating to the surfaces of the pattern and the box which define the surfaces of the tool; coating said surfaces with a thin layer of a tough curable tool surfacing compound; partially filling said pattern box with a liquid epoxy containing at least about 50 volume percent of thermally conductive particulate filler before said surfacing compound fully cures; adding at least about 30 volume percent of the tool volume of chunks of thermally conductive material to said liquid epoxy; filling said box with additional liquid epoxy to cover said chunks; and fully curing said epoxy and surfacing compound such that the internal temperature of the tool never exceeds about 70° C., the presence of the thermally conductive filler and chunks serving to mediate heat generated by the epoxy exotherm to prevent run-away cure, shrink and shape change of the tool with respect to the pattern.

2. A method of making a large, cast-to-size, matched set of epoxy tools for forming sheet stock comprising the steps of providing a pattern of the article to be formed by the tool set; orienting said pattern in a pattern box; applying a release coating to the surfaces of the pattern and the box which define the surfaces of the first tool of the tool set; coating said surfaces with a thin layer of a tough curable tool surfacing compound; partially filling said pattern box with a liquid epoxy containing at least about 50 volume percent of thermally conductive particulate filler before said surfacing compound fully cures; adding at least about 30 volume percent of the tool volume of chunks of thermally conductive material to said liquid epoxy; filling said box with additional liquid epoxy to cover said chunks; and fully curing said epoxy and surfacing compound such that the internal temperature of the said first tool never exceeds about 70° C., orienting the fully cured first tool in a second pattern box; applying a removable layer having the thickness of the sheet stock to be formed by the tool set to the surfaces of the cured first tool and the pattern box that define the working surface of the second tool of the set; applying a release coating to the surfaces of the removable layer and the second box which define the surfaces of the second tool; coating said surfaces for said second tool with a thin layer of a tough curable tool surfacing compound; partially filling said second pattern box with a liquid epoxy containing at least about 50 volume percent of thermally conductive particulate filler before said surfacing compound for the second tool fully cures; adding at least about 30 volume percent of chunks of thermally conductive material to said liquid epoxy; filling said second box with additional liquid epoxy to cover said chunks; and fully curing said epoxy and surfacing compound for said second tool such that the internal temperature of the second tool never exceeds about 70° C., the presence of the thermally conductive filler and chunks serving to mediate heat generated by the epoxy exotherm to prevent run-away cure, shrink and shape change of the first and second tools of the tool set with respect to the pattern.

3. The method of claim 1 where the chunks of thermally conductive material are selected from the group consisting of chunks of tools of like composition, fieldstone or metal.

4. The method of claim 1 where the thermally conductive particulate filler consists essentially of metallic iron.

5. The method of claim 1 where reinforcing rods are positioned in the pattern box before additional liquid epoxy is added to cover the filler chunks.

6. The method of claim 1 where the chunks of thermally conductive material are selected from the group consisting of chunks of tools of like composition or fieldstone and where the thermally conductive particulate filler consists essentially of metallic iron.

7. A method of making a large, cast-to-size epoxy tool comprising the steps of providing a pattern of the article to be formed by the tool; orienting said pattern in a pattern box; applying a release coat to the surfaces of the pattern and the box which define the surfaces of the tool; coating said surfaces with a thin layer of tough, curable tool surfacing compound; at least partially curing said compound; adding at least about 30 volume percent of the tool volume of chunks of thermally conductive material having high compressive strength; filling said pattern box with a liquid epoxy containing at least about 50 volume percent of a thermally conductive particulate filler; and fully curing said epoxy and surfacing compound such that the internal temperature of the tool never exceeds about 70° C., the presence of the thermally conductive filler and chunks serving to mediate heat generated by the epoxy exotherm to prevent run-away cure, shrink and shape change of the tool with respect to the pattern.

\* \* \* \* \*